Aug. 21, 1951   E. V. GIBBONS   2,564,893

QUICK-DETACHABLE CHUCK

Filed May 10, 1948

INVENTOR
EUGENE V. GIBBONS
BY
ATTORNEY

Patented Aug. 21, 1951

2,564,893

UNITED STATES PATENT OFFICE 2,564,893

QUICK-DETACHABLE CHUCK

Eugene V. Gibbons, Boulder, Colo.

Application May 10, 1948, Serial No. 26,081

3 Claims. (Cl. 279—23)

This invention relates to devices, such as chucks, effective to operatively connect a rotatable tool, such as a drill, with a source of power, and has as an object to provide an improved device of such character constructed and arranged to facilitate operative mounting and interchange of tool elements relative thereto.

A further object of the invention is to provide an improved tool-mounting chuck characterized by effective driving grip on an associated tool shank in one direction of its rotation and by shank-freeing release of such grip in the opposite direction of its rotation.

A further object of the invention is to provide an improved tool-mounting chuck that is simple and inexpensive of manufacture, durable and long-lived in use, adapted for driven association with a wide variety of machine tools and powered appliance, susceptible of association in driving relation with an extensive range of tool elements, and efficient and effective in attainment of the ends for which designed.

Figures 1, 2, 3:
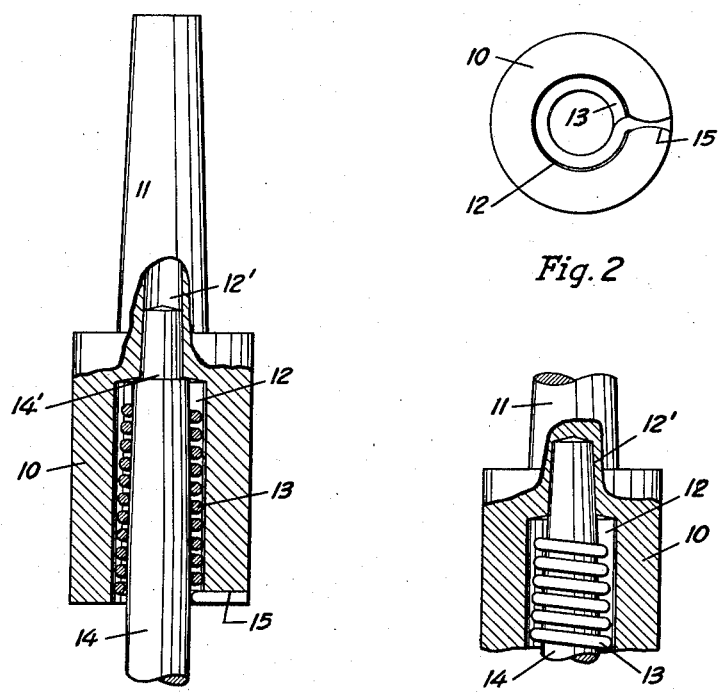
Figures 4, 5:
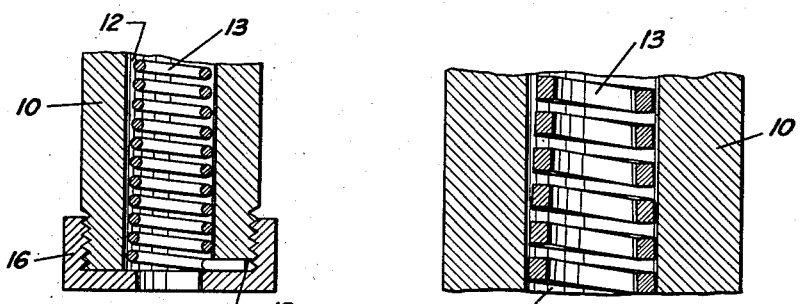

With the foregoing and other objects in view, my invention consists in the construction, arrangement, and combination of elements hereinafter set forth, pointed out in my claims, and illustrated by the accompanying drawing, in which Figure 1 is an elevation, partly in axial section, of a chuck embodying the principles of the invention as associated in driving relation with one type of tool shank. Figure 2 is a bottom plan view of the arrangement according to Figure 1 with the tool shank removed. Figure 3 is a fragmentary, detail elevation, partly in axial section, of a somewhat modified arrangement of elements within the scope and contemplation of the invention. Figure 4 is an axial section through a chuck embodiment as modified within the contemplation of the invention. Figure 5 is a fragmentary, detail axial section, on an enlarged scale, illustrating a still further structural modification within the contemplation of the invention.

A very great range of manufacture, repair, and machining operations involves the power-rotation of a tool element about its axis in pressure-opposition to the material being worked, and it is customary to provide tool holders, known as chucks, in driven relation with power-rotatable shafts and spindles for the centered reception of and gripped engagement with the shanks of tools interchangeable therein. Power-operated, chuck-mounted tools are subject to wear and breakage necessitating their occasional, if not frequent, replacement, and many of the chucks commonly in use require the application of a particular tool for interchange of the tool element carried thereby and correspondingly retard necessary replacement, hence it is a prime object of the instant invention to provide an improved chuck construction wherewith tool elements may be associated and interchanged with speed and facility.

As shown, the improved chuck comprises a generally cylindrical body 10, of any suitable rigid material and particular construction, arranged for coaxial mounted association with the power-rotatable shaft or spindle of a machine tool. The cylinder 10 may be formed and worked in any desired manner to provide particular means adapting it to a given mounted association, the illustrated embodiment being provided with a frusto-conical shank 11, of a slight taper, coaxially projecting integrally from one of the cylinder ends for frictional engagement within the end bore of a driving spindle or shaft, as is common practice.

However formed or equipped for mounting on or driven association with a powered agency, the cylindrical body 10 of the improved chuck is formed or provided with an axial bore 12 traversing the major length of said cylinder and opening through the end of the latter remote from the shank 11 or other cylinder mounting means. The bore 12 is preferably of uniform diameter throughout its length considerably greater than the diameter of the tool shank to be associated therewith, and said bore houses and accommodates a coil spring 13 loosely receivable therein and of a length slightly less than the depth of the bore. The spring 13 may be of uniform interior diameter to present a right-cylindrical socket for telescopic association with and about the slightly tapered end of a tool shank 14, or said spring may be wound in successively smaller convolutions to form a slightly-tapering socket for telescopic association with and about either a straight or a tapered tool shank 14, the alternative constructions noted being functionally identical and being known equivalents, one for the other. In the simplest construction of the improvement, a scarf or notch 15 is cut radially across the cylinder end wall intersected by the bore 12, and an end convolution of the spring 13, whether interiorly straight or tapered, is straightened and bent to project radially and outwardly from the spring end and into position for reception within the scarf 15 when the length of the spring 13 is housed within the bore 12. The spring radial projection seated in the scarf may be there fixed and secured in any convenient or desired manner, it being wholly practical and expedient to peen the scarf margins over and against said projection and thereby retain the spring 13 against escape from the bore 12 of the cylinder 10.

The base, or inner end, of the bore 12 is centrally intersected by a preferably tapered socket 12' coaxial with the body 10 and bore 12 and opening into the latter through its greater end in a diameter slightly less than that of the adjacent spring end opening. As shown in Figure 1, the socket 12' may be indeterminate in axial extent and may entirely traverse the shank 11, or, as alternatively shown in Figure 3, said socket may be relatively short and terminate in a closed inner end generally paralleling and spaced from the bore 12 inner end. It is the function of the socket 12' to telescopically receive the free end or tip of the tool shank 14, to aid and supplement the spring 13 in centering the tool shank relative to the body 10, and to limit and determine axial penetration of said tool shank inwardly of the body 10 and spring 13 in a manner effective to transmit tool-feeding pressures applied to said body to the tool shank, for which latter purpose the tip of the tool shank cooperable with the socket 12' of indeterminate length is formed with an annular shoulder 14' separating the end of the said shank receivable within said socket from a larger-diameter portion of the shank and disposed to bear against the bore 12 base surrounding the intersecting end of the socket 12', as appears in Figure 1, while the shanks 14 of tools cooperable with sockets 12' of the type shown in Figure 3 are simply tapered to fit within and fill such sockets with the tool shank end closing against the associated socket inner end.

Constructed and assembled as shown and described, the chuck unit is mounted by means of its shank 11 as an end extension of and in driven relation on a powered shaft or spindle, the bore of the unit being coaxial with and opening away from the shaft or spindle and the spring 13 being centered within said bore for the reception of and driving relation with a tool shank 14 of proper size and type. To mount the tool in operative relation with the chuck, the end of the tool shank 14 formed with a shoulder 14' is entered within the spring 13 and moved axially and inwardly of the bore 12 against the friction of the spring convolutions on the shank wall until the shank tip enters and seats within the socket 12' with the shoulder 14' closing against the base of the bore 12, in which relation of elements tool-feeding pressures acting in and through the body 12 are transmitted through the shoulder 14' to work effect at the other end of the tool. The tool shank 14 being entered and frictionally held within the spring 13, rotation of the cylinder 10 about its axis acts through the convolutions of the spring 13 to tighten the grip of the latter on and about the shank to the end that power applied to the rotation of the chuck is transmitted through the spring to effect rotation of the shank 14 and associated tool, it being essential, obviously, that the pitch of the spring convolutions be correlated with the direction of chuck rotation so that resistance of the tool shank 14 developed through work of the associated tool operates to tighten the spring winding about the tool shank, thereby increasing the driving grip on the latter. Given a properly correlated pitch of spring convolutions and direction of cylinder 10 rotation, it is immediately apparent that rotation of the tool shank 14 in the direction of chuck drive and at a speed greater than that of chuck rotation will operate to loosen the grip of the spring on and about the tool shank, thus facilitating the withdrawal of the latter from its mounting in the chuck; it being customary, as a practical matter, to arrest the chuck rotation and hold the chuck at rest while the tool shank 14 is manually twisted within the chuck and in the direction of chuck drive, thereby loosening the grip between the spring 13 and tool shank 14 for withdrawal of said shank from the chuck.

When the socket 12' is of the end-closed type shown in Figure 3, mounting, dismounting, and use of the tool is exactly the same as above described save for elimination of the shank shoulder 14' and end engagement of the shank tip with the base of the socket.

The modification according to Figure 4 in no way effects the functions or operative principles of the improvement as hereinabove set forth and is concerned solely with alternative means for holding the spring 13 to and for rotation with the cylinder 10 in a manner conveniently permitting removal and replacement of said spring. As illustrated, the end of the cylinder 10 intersected by the bore 12 and formed with the radial scarf 15 may be externally threaded for cooperation with a threaded cap 16 whereof the end plate is apertured to register with and continue the bore 12 when said cap is in place on the cylinder 10 threaded end. With the spring 13 mounted in the bore 12 of the modified cylinder 10, the radial end projection of the spring is received within the scarf 15 and the cap 16 then firmly and threadedly engaged with the cylinder threaded end, thereby clamping the spring radial extension against escape from its scarf seat and clearing the bore 12 for introduction of a tool shank 14 in the manner and for the purposes above described; the aperture of the cap 16 slidably accommodating the shank 14 to aid in the centering of the tool.

Figure 5 illustrates a particular spring construction wherethrough grip of the spring convolutions on and about a tool shank may be enhanced, the illustrated modification teaching the use of a spring formed from a length of material rectangular in cross section convoluted to bring flat faces of the spring material into registration definitive of a cylinder conformable to that of the tool shank. Springs of the form and type shown in Figure 5 are old and well known, and the springs of such construction function in the assembly exactly the same as the more conventional such units, with perhaps advantage of enhanced drive grip.

As will be apparent, the various modifications illustrated and described may be used singly or in combination, as may be deemed practical and expedient, said modifications in no sense altering the operative principles of the improvement as exemplified in its simplest form.

Since many changes, variations, and modifications in the specific form, construction, and arrangement of elements shown and described may be had without departing from the spirit of my invention, I wish to be understood as being limited solely by the scope of the appended claims, rather than by any details of the illustrative showing and foregoing description.

I claim as my invention:

1. A quick-detachable chuck comprising a generally-cylindrical body connectible in driven relation with and as a coaxial end extension of a rotatable spindle, a cylindrical bore coaxially within and opening through the free end of said body, a coil spring adapted for the telescopic reception of a tool shank loosely within and substantially filling said bore, a notch radially of the body free end wall, and an adjacent spring end length extended radially from the coil and secured in said notch.

2. A quick-detachable chuck comprising a generally-cylindrical body connectible in driven relation with and as a coaxial end extension of a rotatable spindle, a cylindrical bore coaxially within and opening through the free end of said body, a coil spring adapted for the telescopic reception of a tool shank loosely within and substantially filling said bore, a notch radially of the body free end wall, and an adjacent spring end length extended radially from the coil and secured in said notch to dispose the spring convolutions in trailing, inwardly-spiralling relation with the direction of body driven rotation.

3. The organization according to claim 2, wherein the radial notch margins are peened over and in securing relation against the spring end length engaged in said notch.

EUGENE V. GIBBONS.

REFERENCES CITED

The following references are of record in the file of this patent:

UNITED STATES PATENTS

| Number | Name | Date |
|---|---|---|
| 1,552,085 | Shiek | Sept. 1, 1925 |
| 2,105,330 | Pagenkopf | Jan. 11, 1938 |
| 2,467,606 | Young | Apr. 19, 1949 |